US012565341B2

(12) United States Patent
Kaiser et al.

(10) Patent No.: US 12,565,341 B2
(45) Date of Patent: Mar. 3, 2026

(54) MANNED AND UNMANNED AIRCRAFT

(71) Applicant: Dronexus Aero LLC, Hagerstown, MD (US)

(72) Inventors: James Kaiser, Hagerstown, MD (US); William Vatis, Arlington, VA (US)

(73) Assignee: Dronexus Aero LLC, Hagerstown, MD (US)

( * ) Notice: Subject to any disclaimer, the term of this patent is extended or adjusted under 35 U.S.C. 154(b) by 0 days.

(21) Appl. No.: 18/097,935

(22) Filed: Jan. 17, 2023

(65) Prior Publication Data

US 2023/0150657 A1 May 18, 2023

Related U.S. Application Data

(63) Continuation of application No. 16/192,330, filed on Nov. 15, 2018, now Pat. No. 11,554,857, which is a
(Continued)

(51) Int. Cl.
| | |
|---|---|
| *B64U 10/13* | (2023.01) |
| *B64C 25/06* | (2006.01) |
| *B64C 27/12* | (2006.01) |
| *B64C 27/14* | (2006.01) |
| *B64C 27/50* | (2006.01) |
| *B64D 17/80* | (2006.01) |
| *B64D 35/06* | (2006.01) |
| *B64U 30/24* | (2023.01) |
(Continued)

(52) U.S. Cl.
CPC .............. *B64U 10/13* (2023.01); *B64C 25/06* (2013.01); *B64C 27/12* (2013.01); *B64C 27/14* (2013.01); *B64C 27/50* (2013.01); *B64D 17/80*

(2013.01); *B64D 35/06* (2013.01); *B64U 30/24* (2023.01); *B64U 40/10* (2023.01); *B64C 2027/8272* (2013.01); *B64U 10/60* (2023.01); *B64U 50/31* (2023.01)

(58) Field of Classification Search
CPC ........ B64U 10/13; B64U 40/10; B64C 27/10; B64C 27/14; B64C 27/20; B64C 2027/8272; B64C 39/062; B64C 39/064; B64D 35/06
See application file for complete search history.

(56) References Cited

U.S. PATENT DOCUMENTS

| | | |
|---|---|---|
| D139,424 S | 11/1944 | Bates |
| 2,521,684 A | 9/1950 | Bates |
(Continued)

FOREIGN PATENT DOCUMENTS

| | | | | |
|---|---|---|---|---|
| CN | 114514173 B | * | 9/2024 | ............. B64C 11/18 |

OTHER PUBLICATIONS

International Search Report & Written Opinion for PCT/US2016/048492, dated Sep. 27, 2019, 10 pages.

*Primary Examiner* — Joseph W Sanderson
(74) *Attorney, Agent, or Firm* — BLANK ROME LLP

(57) ABSTRACT

A manned or unmanned aircraft has a main body with a circular shape and a circular outer periphery. One or more rotor blades extend substantially horizontally outward from the main body at or about the circular outer periphery. In addition, one or more counter-rotation blades extend substantially horizontally outward from said main body at or about the circular outer periphery, but vertically offset from the main rotor blades.

16 Claims, 5 Drawing Sheets

Related U.S. Application Data continuation-in-part of application No. 15/883,781, filed on Jan. 30, 2018, now Pat. No. 10,669,019, which is a continuation of application No. 15/600,296, filed on May 19, 2017, now Pat. No. 9,896,196, which is a continuation-in-part of application No. 15/058,708, filed on Mar. 2, 2016, now Pat. No. 9,840,323, which is a continuation-in-part of application No. 14/712,062, filed on May 14, 2015, now Pat. No. 9,555,879.

(60) Provisional application No. 62/724,475, filed on Aug. 29, 2018, provisional application No. 62/001,418, filed on May 21, 2014.

(51) Int. Cl.

| | |
|---|---|
| *B64U 40/10* | (2023.01) |
| *B64C 27/82* | (2006.01) |
| *B64U 10/60* | (2023.01) |
| *B64U 50/31* | (2023.01) |

(56) References Cited

U.S. PATENT DOCUMENTS

| | | | | |
|---|---|---|---|---|
| 2,740,595 | A | 4/1956 | Bakewell | |
| 2,935,275 | A | 5/1960 | Grayson | |
| 3,041,012 | A | 6/1962 | Gibbs | |
| 3,064,925 | A | 11/1962 | Preston | |
| 3,142,455 | A | 7/1964 | Burke | |
| 3,210,025 | A | 10/1965 | Lubben | |
| 3,321,021 | A | 5/1967 | Girard | |
| D213,529 | S | 3/1969 | Sherwood | |
| 3,470,765 | A | 10/1969 | Campbell | |
| D215,971 | S | 11/1969 | Rosta | |
| D217,000 | S | 3/1970 | Getz | |
| 3,690,597 | A | 9/1972 | Di Martino | |
| 4,071,206 | A | 1/1978 | Magill | |
| 4,787,573 | A | 11/1988 | Pauchard | |
| D307,884 | S | 5/1990 | Ninkovich | |
| D312,067 | S | 11/1990 | Walling | |
| D320,378 | S | 10/1991 | Webster | |
| 5,072,892 | A | 12/1991 | Carrington | |
| 5,203,521 | A | 4/1993 | Day | |
| 5,807,202 | A | 9/1998 | Sammataro | |
| 5,984,753 | A | 11/1999 | Perez | |
| D418,475 | S | 1/2000 | Milde, Jr. | |
| D430,530 | S | 9/2000 | Milde, Jr. | |
| 6,308,912 | B1 | 10/2001 | Kirjavainen | |
| 7,407,132 | B2 | 8/2008 | Kirjavainen | |
| 7,604,198 | B2 | 10/2009 | Petersen | |
| 7,607,607 | B2 * | 10/2009 | Darrow, Jr. | B64C 27/12 |
| | | | | 244/17.23 |
| 8,033,498 | B2 | 10/2011 | Blackbum | |
| D667,893 | S | 9/2012 | Smith | |
| D669,836 | S | 10/2012 | Ordonez | |
| D670,638 | S | 11/2012 | Goelet | |
| 8,302,901 | B2 | 11/2012 | Hatton et al. | |
| 8,322,649 | B2 | 12/2012 | Martin | |
| 8,556,207 | B2 | 10/2013 | Cilli | |
| 8,882,025 | B2 * | 11/2014 | Lauder | B64C 7/00 |
| | | | | 416/129 |
| D725,028 | S | 3/2015 | Kapitan | |
| D725,575 | S | 3/2015 | Kapitan | |
| 8,979,016 | B2 | 3/2015 | Hayden, III | |

| | | | | |
|---|---|---|---|---|
| 9,004,393 | B2 | 4/2015 | Barrett-Gonzales | |
| D760,624 | S | 7/2016 | Balaresque | |
| 9,527,588 | B1 | 12/2016 | Rollefstad | |
| 9,555,879 | B1 | 1/2017 | Kaiser | |
| D780,665 | S | 3/2017 | Blincow | |
| D785,717 | S | 5/2017 | Xiao | |
| D798,221 | S | 9/2017 | Kaiser | |
| D803,327 | S | 11/2017 | Gaus | |
| 9,840,323 | B1 | 12/2017 | Kaiser | |
| D806,607 | S | 1/2018 | Zhydanov | |
| 9,896,196 | B1 | 2/2018 | Kaiser | |
| D813,761 | S | 3/2018 | Balaresque | |
| D814,350 | S | 4/2018 | Joo | |
| D814,971 | S | 4/2018 | Huang | |
| D815,580 | S | 4/2018 | Kim | |
| D816,546 | S | 5/2018 | Wang | |
| D821,264 | S | 6/2018 | Choo | |
| D829,283 | S | 9/2018 | Cai | |
| D830,228 | S | 10/2018 | Grassi | |
| D830,897 | S | 10/2018 | Choi | |
| 10,099,785 | B1 | 10/2018 | Gonzalez | |
| D846,033 | S | 4/2019 | Oas | |
| 10,336,434 | B2 * | 7/2019 | Cai | B64C 13/50 |
| 10,343,771 | B1 | 7/2019 | Kaiser | |
| D856,259 | S | 8/2019 | Li | |
| D859,536 | S | 9/2019 | Cope | |
| D860,332 | S | 9/2019 | Cope | |
| D870,017 | S | 12/2019 | Meng | |
| 10,625,858 | B2 * | 4/2020 | Eleryan | B64U 40/10 |
| D886,909 | S | 6/2020 | Zhou | |
| 10,669,019 | B2 | 6/2020 | Kaiser | |
| D904,967 | S | 12/2020 | Kaiser | |
| 11,542,000 | B2 * | 1/2023 | Eleryan | B64U 50/19 |
| 11,554,857 | B2 | 1/2023 | Kaiser | |
| 2003/0136875 | A1 | 7/2003 | Pauchard | |
| 2005/0067527 | A1 | 3/2005 | Petersen | |
| 2009/0121076 | A1 | 5/2009 | Blackbum | |
| 2010/0270423 | A1 * | 10/2010 | Lauder | B64C 27/10 |
| | | | | 244/17.19 |
| 2014/0299708 | A1 * | 10/2014 | Green | B64C 27/58 |
| | | | | 244/17.11 |
| 2016/0016664 | A1 | 1/2016 | Basuni | |
| 2016/0179096 | A1 | 6/2016 | Bradlow | |
| 2016/0214713 | A1 | 7/2016 | Cragg | |
| 2016/0336020 | A1 | 11/2016 | Bradlow | |
| 2016/0376031 | A1 | 12/2016 | Michalski | |
| 2017/0029104 | A1 | 2/2017 | Kim | |
| 2017/0217323 | A1 | 8/2017 | Antonini | |
| 2017/0225792 | A1 | 8/2017 | Wang | |
| 2017/0274983 | A1 | 9/2017 | Beckman | |
| 2017/0313441 | A1 | 11/2017 | Tsai | |
| 2018/0022461 | A1 | 1/2018 | Nunes | |
| 2018/0044005 | A1 | 2/2018 | Hayden, III | |
| 2018/0196418 | A1 | 7/2018 | Meier | |
| 2018/0244378 | A1 | 8/2018 | Kaiser | |
| 2018/0244385 | A1 | 8/2018 | Kim | |
| 2019/0009885 | A1 * | 1/2019 | Cai | B64U 10/10 |
| 2019/0009893 | A1 | 1/2019 | Toyama | |
| 2019/0185161 | A1 * | 6/2019 | Eleryan | B64U 40/10 |
| 2019/0193847 | A1 | 6/2019 | Kaiser | |
| 2019/0193848 | A1 | 6/2019 | Kaiser | |
| 2020/0391865 | A1 * | 12/2020 | Eleryan | B64U 50/14 |
| 2023/0150657 | A1 * | 5/2023 | Kaiser | B64C 27/50 |
| | | | | 244/23 C |
| 2023/0150664 | A1 * | 5/2023 | Eleryan | B64C 9/08 |
| | | | | 244/17.13 |

* cited by examiner

MANNED AND UNMANNED AIRCRAFT

RELATED APPLICATIONS

This application is a continuation of U.S. application Ser. No. 16/192,330, filed Nov. 15, 2018, now U.S. Pat. No. 11,554,857, which is a continuation-in-part of application Ser. No. 15/883,781, filed Jan. 30, 2018, now U.S. Pat. No. 10,669,019, which is a continuation of application Ser. No. 15/600,296, filed May 19, 2017, now U.S. Pat. No. 9,896, 196, which is a continuation-in-part of application Ser. No. 15/058,708, filed Mar. 2, 2016, now U.S. Pat. No. 9,840,323, which is a continuation-in-part of application Ser. No. 14/712,062, filed May 14, 2015, now U.S. Pat. No. 9,555, 879, which claims priority to provisional Application No. 62/001,418, filed May 21, 2014. In addition, this application claims the benefit of U.S. Provisional Application No. 62/724,475, filed Aug. 29, 2018. The entire contents of the foregoing patents and applications are incorporated herein by reference.

BACKGROUND OF THE INVENTION

Field of the Invention

The present invention relates to a manned aircraft as well as an unmanned or drone aircraft. More particularly, the present invention relates to a manned and unmanned aircraft, having a circular shape and blades positioned about the outer circumferential periphery. Both the manned and unmanned crafts operate upon the same central drive and lift system at a point between the craft's outer periphery and the center axis.

Background of the Related Art

In current helicopters, a mechanically intricate system featuring a vertical drive shaft (mast) connected to an engine (gas piston or jet turbine) turn a series of blades that are very elongated and narrow. The rotational spinning of the blades about the mast at a sufficient RPM creates a lift factor consistent with the Bernoulli Principle. One way to move the helicopter forward or backward, is to provide a mechanical assembly on the drive shaft that can change the angle of the shaft either forward or backward, thus tilting the blades forward to achieve forward movement and backward to achieve backward movement. Similarly, another intricate mechanical linkage allows for the pilot to change the blades' angle of attack thus increasing and decreasing the lift factor of the blades. The drive system is at a mechanical disadvantage since it is positioned at the vertical axis of rotation, requiring a high torque or a complex transmission to provide ample RPMs for the greatly elongated and narrow blades to achieve lift.

This entire drive system is permanently affixed well above the helicopter's horizontal centerline. However, this creates a top-heavy platform, and many helicopter crashes result in the craft rolling or flipping on contact. To prevent the main lift blades spinning force to cause the craft to spin uncontrollably, a geared mechanical link from the main engine and mast to a tail rotor counteracts the main blades effect and allows the craft to remain stable, such as current industry standard helicopters which are inherently top-heavy platforms and current industry standard quad copters which become unstable and crash if any one of the blades/motors fail.

Despite many variations of airframe body designs (improved aerodynamic bodies), there remains essentially an identical center line torque at center axis drive systems. Current industry design configurations for rotor type drones/Unmanned Aircraft Vehicles (UAVs) usually have 3-6 vertically mounted motors connected to propellers, each on a single vertical shaft. This configuration/design commonality has an inherent weakness. If any one of the motor/propeller assemblies fail, the drone/UAV craft will become unstable and experience uncontrollable flight.

SUMMARY OF THE INVENTION

Accordingly, it is an object of the invention to provide an aircraft that is highly stable, maneuverable, and mechanically efficient, and especially one that can be utilized as a helicopter in both a manned and unmanned variant and avoids the dangers involved during a mechanical failure such as current industry standard helicopters which are inherently top-heavy platforms and current industry standard quad copters which become unstable and crash if any one of the blades/motors fail.

This invention changes the historical concept of helicopters by modifying the entire mechanical and lift structure mechanisms. The present invention is a circular saucer-shaped craft and is related to U.S. Pat. Nos. 9,555,879, 9,840,323, D798221, and 9,896,196, as well as U.S. Publ. No. 2018/0244378, the entire contents of which are hereby incorporated by reference. The invention has a series of main lift and counter rotation blades emanating from the craft's horizontal center line and having a drive system at a point between the craft's outer periphery and its' center vertical axis. Such a drive configuration away from the center vertical axis creates an inherent torque advantage allowing for the use of a variety of blades without the need for a discrete transmission as used in current industry standard helicopters. The design and configuration allows for the craft to be a variety of sizes and the flexibility to be configured in either a manned or UAV variant.

An aircraft is provided that has the rotor blades at the outer periphery of the craft and at or about the horizontal centerline of the craft. Accordingly, the aircraft is highly aerodynamic since the air flow generated by the blades is unobstructed by the rest of the aircraft, including the fuselage, except with respect to the flaps (discussed in more detail below). That creates greater thrust, lift and higher efficiency. Much shorter and wider rotor blades are utilized, and the angle of attack is permanently fixed at a predetermined constant lift position with the motors affixed in a position away from the craft's center vertical axis which include a shaft gear significantly smaller than the blade drive gear creating a substantial torque advantage. The rotor blades are coupled with the drive system at the general center of mass of the craft. The invention alleviates the need for a blade tilt system and achieves greatly enhanced mechanical advantage, including increased torque at the blade's drive point. Such a drive configuration is offset from the immediate center axis location, creating a distinct torque advantage to the lift blades.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
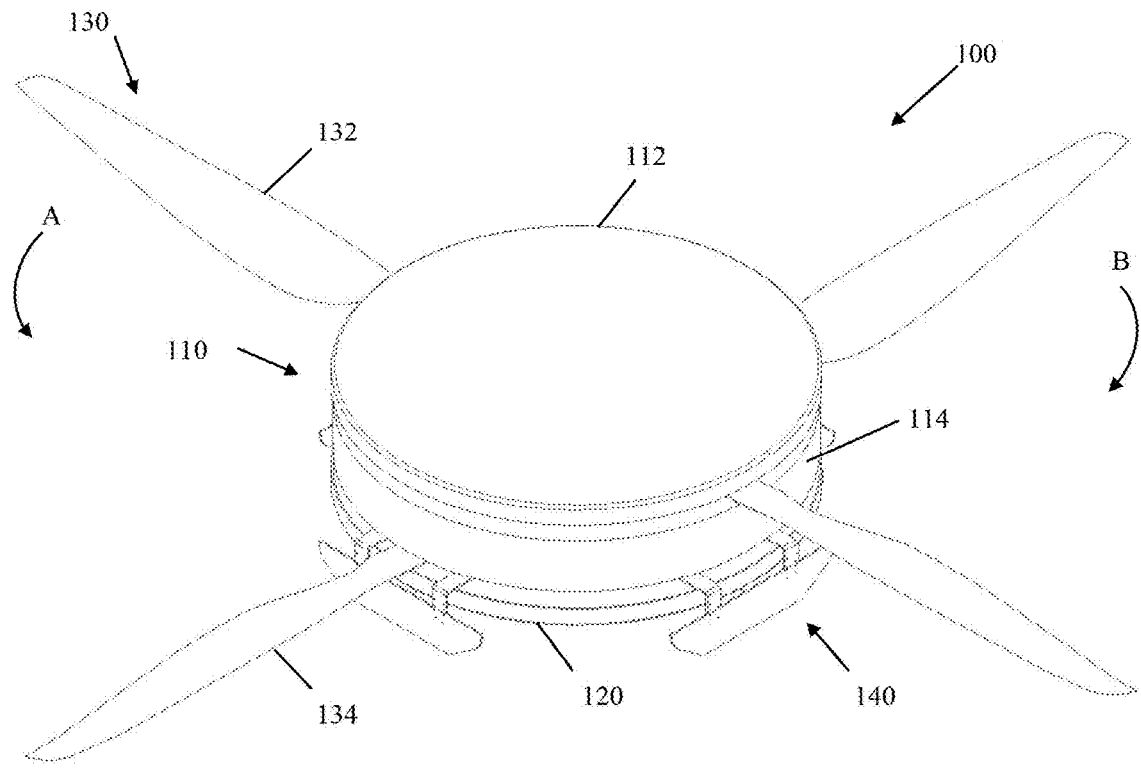
FIG. 1 is a perspective view of the aircraft in accordance with a preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIGS. 1-7 show an aircraft 100 in accordance with one preferred embodiment of the invention. The aircraft 100 includes a main housing or body 110, blades 130, and a drive system 200.

The main body 110 has an upper body portion 112 which includes a top saucer-dome assembly and a lower body portion 120 which likewise includes a saucer-dome. The upper and lower body portions 112, 120 each include a dome portion and an end plate. The upper and lower body portions 112, 120 can each have open cavities/fuselages for cargo, equipment, passengers etc. In addition, landing gear (not shown) can be provided on the lower body portion 120, and other usual features such as a cockpit, seating, windows, doors/hatches to receive persons and product, can be provided at the upper or lower body portions 112, 120. As shown, the aircraft 100 has a different design for an aircraft, and is especially suited as a helicopter-type aircraft, for manned or unmanned flight. The landing gear can extend downward from the lower body portion 120, and can optionally be retracted to a compartment inside the lower body 120 when the craft 100 is in flight. Furthermore, the seating can pivot with respect to the body portions to remain horizontal even while the craft is at a tilt.

The main body 110 has a generally circular shape when viewed from the top (i.e., a horizontal cross-section) (FIG. 1). That provides an aerodynamic shape for the aircraft 100. A middle or central horizontal axis 116 is formed between the upper and lower body portions 112, 120. Thus, the central horizontal axis or line 116 extends laterally across and transversely midway between the top and bottom 112, 120 of the main body 110. The upper body portion 112 is dome- or saucer-shaped with a smaller top part and becoming wider toward the central horizontal axis 116. The lower body portion 120 has an inverted dome- or saucer-shape with a smaller bottom part and becoming wider toward the central horizontal axis 116. Thus, the main body 110 has a generally circular/saucer shape when viewed from the side, and a circular central outer periphery or outer perimeter or periphery 115 that forms the widest and outermost part of the main body 110.

Figure 5:
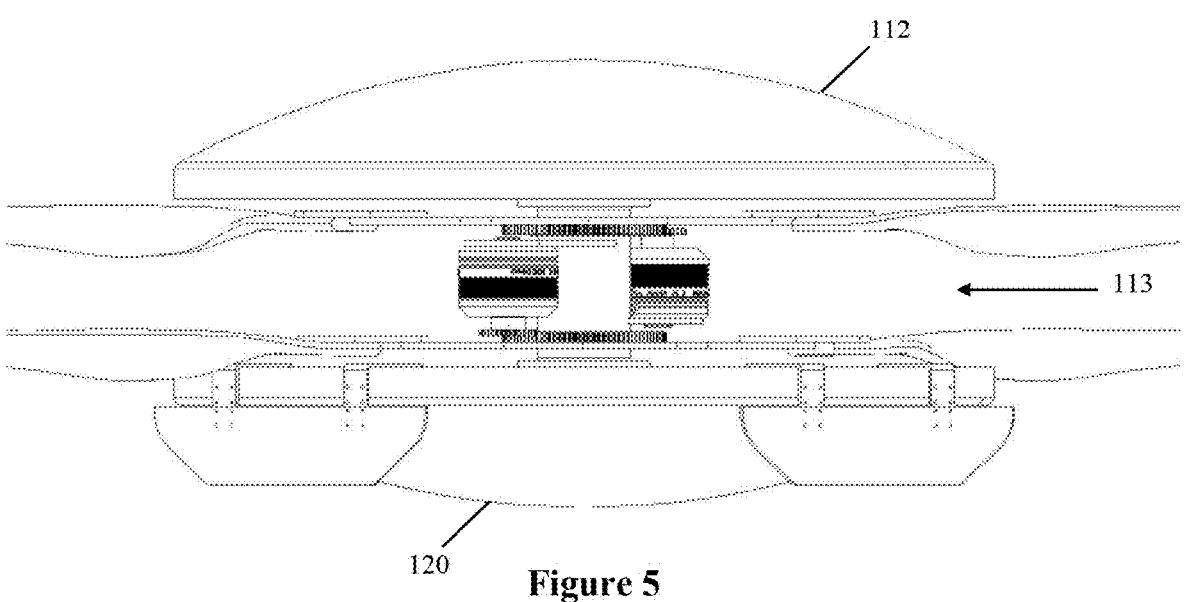
FIG. 5 is an enlarged partial side view of the aircraft with the protective ring removed to show the gear mechanism.

The upper and lower body portions 112, 120 can be formed separately and coupled together, or the entire main body 110 can be a single piece integrated device. In addition, while the upper and lower body portions 112, 120 are shown being substantially equal in size and shape, other suitable embodiments can be provided. For instance, the upper body 112 can be smaller and differently shaped than the lower body 120. In addition, both the upper and lower bodies 112, 120 need not be circular or dome-shaped but can have a different shape (such as rectangular or square), with an outer circular ring (either internal or external to the main body) for the blades. As best shown in FIG. 5, the upper and lower body portions 112, 120 are separated from each other to define a channel 113 therebetween. The channel 113 can be an open space or area at which the drive system 200 (FIG. 4) is located to operate the rotation of the blades 130.

Figure 2:
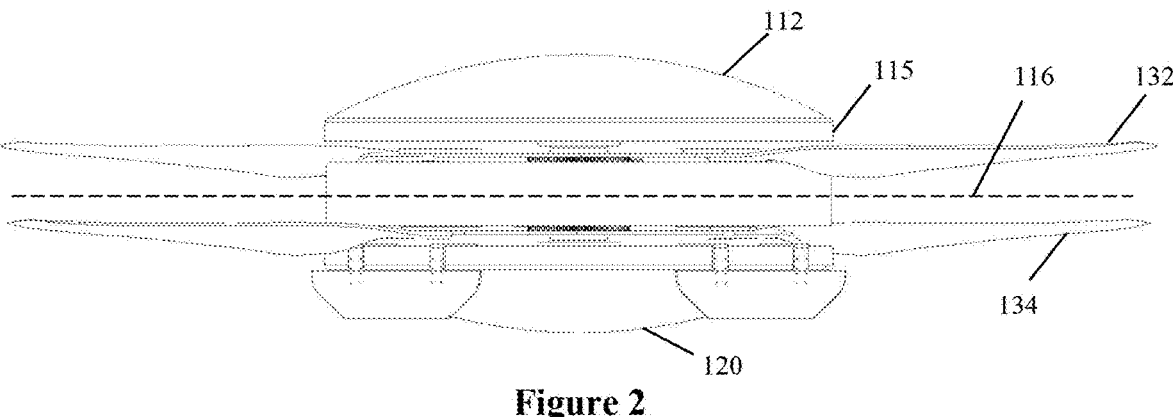
FIG. 2 is a side view of the aircraft of FIG. 1.
Figure 3:
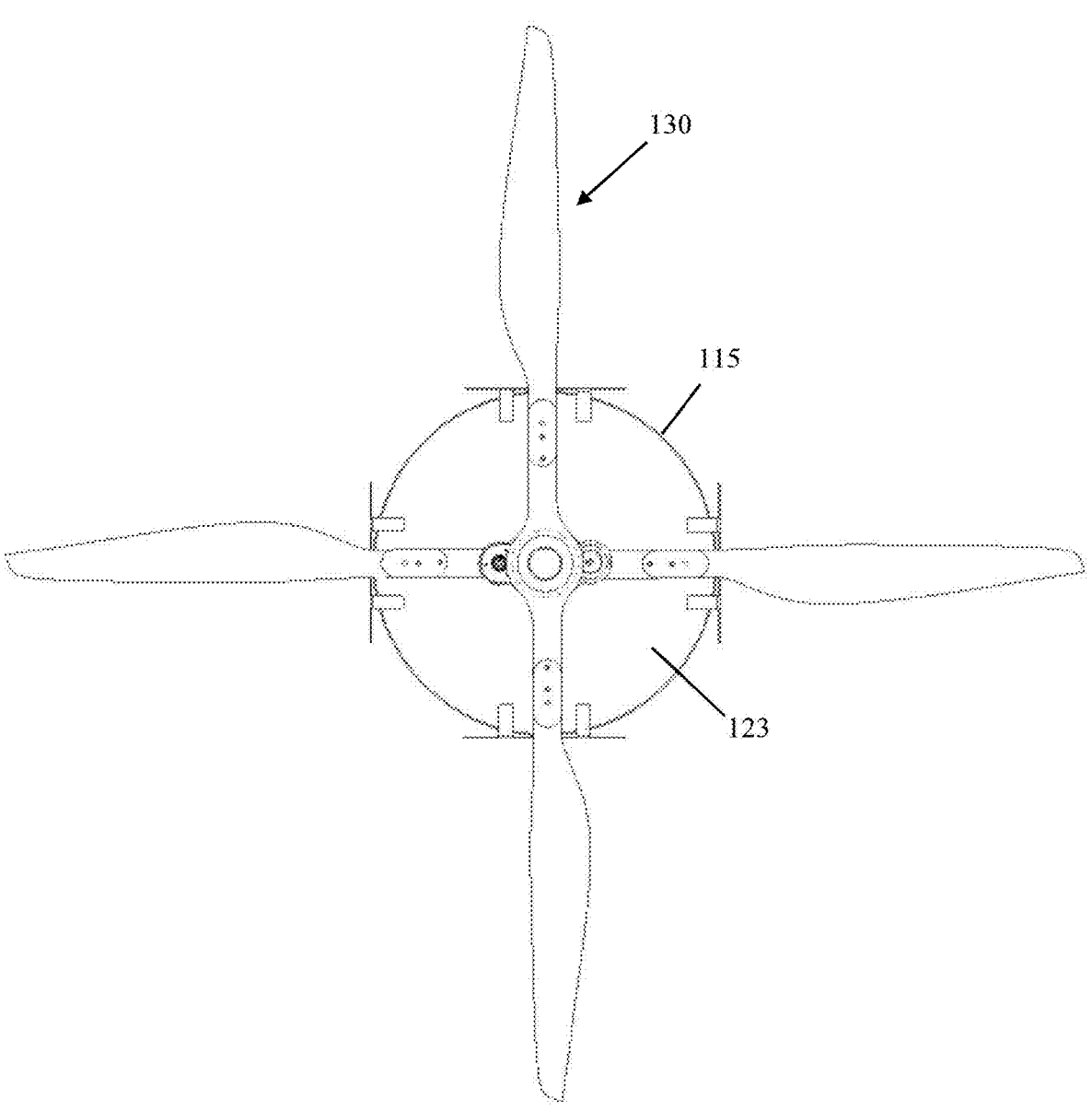
FIG. 3 is a top cross-sectional view of the aircraft with the upper fuselage and protective ring removed to show the gear mechanism.
Figure 4:
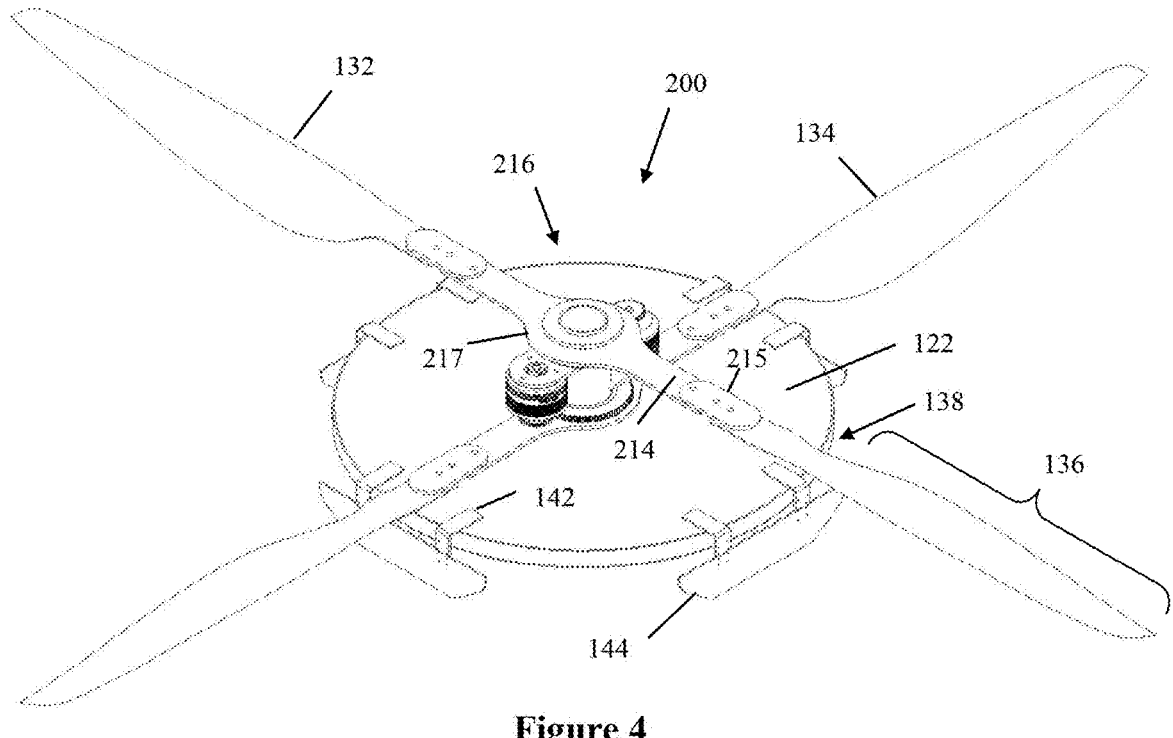
FIG. 4 is a perspective view of FIG. 3.

The blades 130 include two or more upper blades 132 and two or more lower blades 134. All of the blades 130 are positioned between the upper cavity 112 and the lower cavity 120. In one embodiment the upper blades 132 can be lift blades, and the lower blades 134 can be counter-rotation (or anti-torque) airfoil blades. Referring to FIG. 2, the upper blades 112 are positioned above the central horizontal axis 116 and the lower blades 120 are positioned below the central horizontal axis 116. Given the torque advantage realized by the craft's drive system, a variety of blade designs and sizes can be readily and interchangeably attached to the craft based on mission sets and lift requirements. Unlike current industry standard helicopter blades which utilize cyclical pitch action, the present inventions fixed blades allow for increase aerodynamic efficiency. The blades are spaced at approximately 2" allowing for the lower counter rotation blades to engage relatively static air.

As best shown in FIG. 5, the drive system 200 is positioned substantially about the central horizontal axis 116, so it is in the channel 113 below the upper body portion 112 and above the lower body portion 120. That results in a low center of gravity. The dome/saucer cavity of the upper body 112 above the center line 116 can have either pilot and passenger compartments in a manned variant or various electronic or weapons payloads in an unmanned variant. Passengers and pilot can also be in the lower body 120. In addition, a range of two to six main lift and counter rotation blades 134 are provided at the outer periphery 115 of the main body 110 and directly below the main blades 132, as best shown in FIG. 2. The main lift blades 132 and the counter-rotation blades 134 create a balanced and low center of gravity craft 100. The main blades 132 and the counter-rotation blades 134 are substantially smaller in length and can be larger in width than the traditional helicopter rotor blades.

The length, width and thickness of the blades are contingent upon the size of the craft's main body. In one embodiment, the two main lift blades 132 and the two counter rotation blades 134 are sufficient to provide lift, though more or fewer blades can be provided, and can have be 2-5 feet in chord width and 12-16 feet in blade length. In general, the blade length and chord width will be contingent on the size and weight of the craft.

Referring to FIGS. 3-6, 8, the lower body portion 120 has a lower structural plate 123 that can be formed integral with the dome or separate and connected to the dome. In the embodiment shown, the plate 123 is a circle and flat. A drive system 200 is mounted to the inner or top surface 122 of the plate 123. The drive system 200 includes a drive assembly 210 and a gear assembly 250. The gear assembly 250 drives the drive assembly 210, which in turn drives the blades 130.

Figure 6:
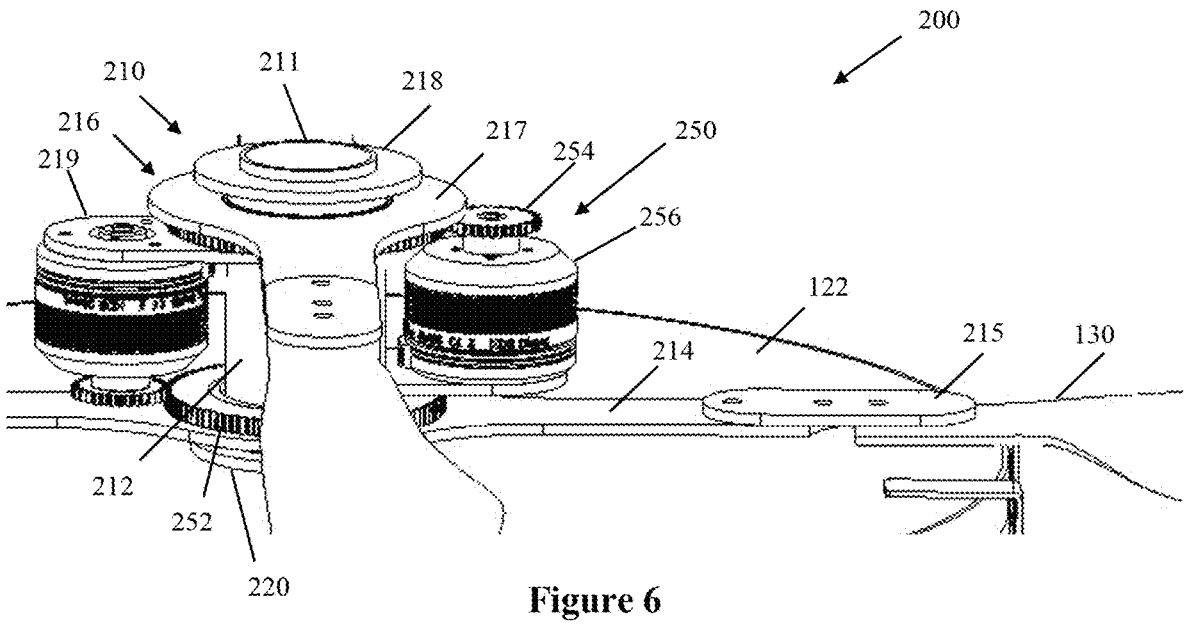
FIG. 6 is a detailed perspective view of the gear mechanism.

More specifically, as best shown in FIG. 6, the drive assembly 210 includes a hollow center shaft 211, upper and lower ring mounts 218, 220, upper and lower blade mounts 216, upper and lower bearings 252, upper and lower motor mount 219, and a spacer 212.

Figure 8:
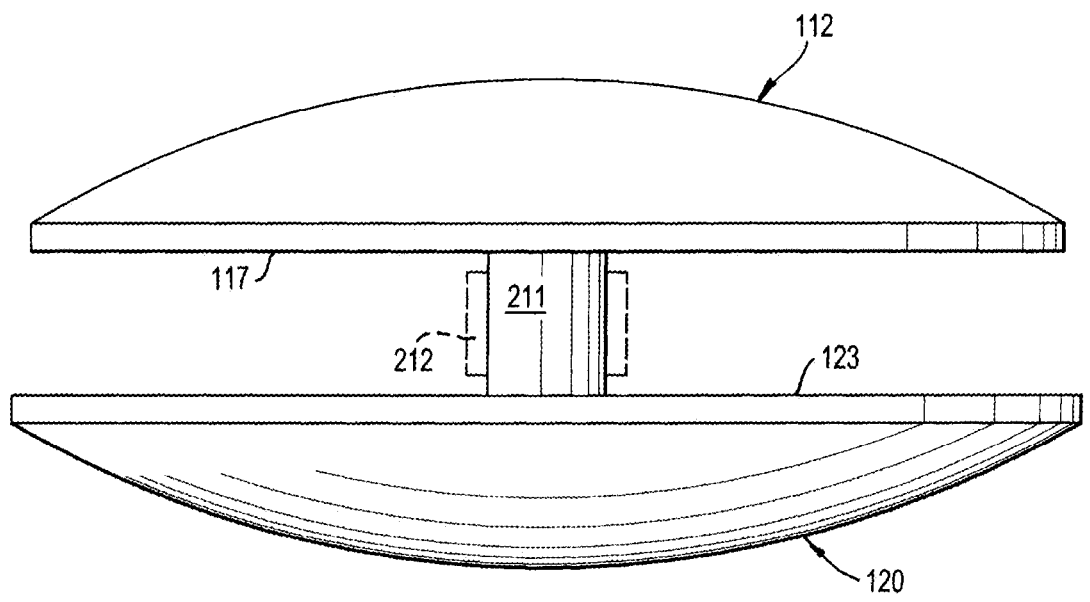
FIG. 8 is a side view of the aircraft with the protective band and blades removed to show the center shaft.

As best shown in FIG. 8, the hollow center shaft 211 extends between an upper plate 117 (which forms the bottom of the upper saucer 112) and a lower plate 123 (which forms the top surface 122 of the lower saucer 120). The shaft 211 forms the major axis of rotation about which the blades 130 operate. The shaft 211 is an elongated circular hollow member that has a top end and a bottom end, but has surrounding it a spacer 212 to which are connected the motor mounts including the platforms 219 and the bottom bearing 252. The top end is connected or coupled to a bottom plate 117 of the upper body 112, and the bottom end is connected or coupled to a plate 123 of the lower body 120. The center shaft 211 is fixed to the upper and lower bodies 112, 120, such as by welding or the like. Thus, the center shaft 211 fixedly couples the upper body 112 to the lower body 120, which remain stationary with respect to each other.

In addition, the connective shaft 211 can have a variety of functions and capabilities. In a manned version of the craft, this shaft 211 can be used for pilot and passenger ingress and egress from the craft through the bottom 120 area. The shaft 211 can incorporate a ladder or stairs enabling the pilot and passengers to move been the upper and lower domes 112, 120.

An upper ring mount 218 is provided at the top end of the shaft 211 to mount the shaft 211 to the upper body 112, and a lower ring mount 220 is provided at the bottom end of the shaft 211 to mount the shaft 218 to the bottom body 120. The ring mount 218 is a flat circular plate or member with a center opening that receives the shaft 211. The ring mount 218 is fixedly coupled to the respective bottom and top surfaces 122 of the bodies 112, 120. Accordingly, the ring mount 218 remains stationary with respect to the bodies 112, 120 as the shaft 211 rotates therein. The ring mount 218 supports the shaft 211 and the connection of the shaft 211 to the respective body 112, 120. The shaft 211 is an elongated tube with a hollow center and the open top end is received in an opening of the bottom connector plate 122 of the upper body 112, and the open bottom end is received in an opening of the top connector plate 122 of the lower body 120. In that manner, material (e.g., electrical wires) can be passed via the center shaft 211 between the lower body 120 and the top body 112.

A blade mount 216 is positioned about the shaft 211 inside of the ring mount 218, 220 (i.e., so that the ring mounts 218, 220 are respectively between the plates 117, 123 and the blade mounts 216). The blade mount 216 is situated about the shaft 211 and has a circular central portion 217 and outward extending arms 214. The central portion 217 is a flat circular plate or member with a center opening that rotatably receives the shaft 211. Thus, the blade mount 216 is rotatably mounted to the shaft 211 so that the blade mount 216 can rotate with respect to the shaft 211 and the upper and lower bodies 112, 120. The arms 214 are elongated flat plates or members that are integral with and extend outward from the central portion 217. As shown, two arms 214 can be provide opposite each other. However, any number of arms 214 can be utilized and provided at the outer periphery of the center portion 217.

A bearing 252 is provided at the inner-facing surface of the center portion 217 of the blade mount 216. The bearing 252 can be a gear with a bearing press fit onto it, and is rotatably engaged with the shaft 211. An upper bearing 252 is provided at the lower surface (in the embodiment of FIG. 6) of the upper blade mount 216, and a lower bearing 252 is provided the upper surface (in the embodiment of FIG. 6) of the lower blade mount 216. The bearing 252 is fixedly mounted to the respective surface of the blade mount 216, so that the bearing 252 and blade mount 216 are fixed together. Thus, when the bearing 252 rotates, the blade mount 216 also rotates. The bearing 252 has a center opening and is positioned about the center shaft 211 and rotates with respect to the shaft 211. The bearing 252 is circular and can have an outer periphery with teeth or notches that extend outward with respect to the shaft 211.

The motor mount 219 is mounted to the center shaft 211 and positioned inside of the bearing 252 (i.e., so that the bearing 252 is between the motor mount 219 and the blade mount 216). The motor mount 219 is a flat plate or member and extends perpendicularly outward from the center shaft 211 to form a support platform. Thus, the drive assembly 210 includes an upper support platform or motor mount 219 that is positioned below the upper bearing 252 and the upper blade mount 216 (in the embodiment of FIG. 6), and a lower support platform or motor mount 219 that is positioned above the lower bearing 252 and the lower blade mount 216 (in the embodiment of FIG. 6).

A spacer 212 can be provided about the middle section of the center shaft 211. The spacer 212 is a sleeve or tube that is slightly larger than the center shaft 211 and concentrically extends about the center shaft 211. The spacer 212 is provided at the middle section of the center shaft 211, and extends from and is fixedly coupled to the upper and lower motor mounts 219. The spacer 212 can be fixedly mounted to the shaft 211. In addition, the motor mount 219 is fixedly mounted (e.g., welded) to the spacer 212 and/or to the center shaft 211 so that the motor mount 219 remains stationary with respect to the shaft 211 (and the shaft 211 remains stationary with respect to the upper and lower bodies 112, 120). The spacer 212 (as well as the motor mounts 219) creates a distance between the upper and lower elements (i.e., motor mount 219, bearings 252) so that the upper blades 132 do not come into contact with the lower blades 134 and to provide space for the motors 256 to be positioned between the upper and lower blades mounts 216. In a manned variant of this craft, the larger/heavier blades might bend to a degree so extra spacing between the upper main lift and lower counter rotation blades can be provided.

The gear assembly 250 includes the bearing 252, gear 254 and motor 256. The motor 256 is elongated and circular and has a top end and a bottom end and is powered by a power source (not shown), such as batteries that are housed in the lower body 120. In addition, Electronic Speed Controllers (ESC) can be mounted to outside the center shaft 211. This is to allow cooling from airflow provided by turbulence of rotor arms. And is good for center of mass, and helps with packaging, leaves top and bottom cavities open for other things. The ESC is a necessary addition regulating power levels to the motors. The ESC can be used to control and regulate the speed of the motor 256.

The gear 254 is coupled at the top end of the motor 256. The motor 256 drives the gear 254 to rotate with respect to the motor. The bottom end of the motor 256 is fixedly coupled to the motor mount 219 so that the motor 256 remains stationary with respect to the support platform 219, shaft 211, and upper and lower bodies 112, 120. The gear 254 is a flat circular member and has teeth or notches extending outward. The gear 254 is aligned with and pressed onto a respective bearing 252. Thus, the motor 256 rotates the gear 254, which in turn rotates the gear/bearing 252, which in turn rotates the blade mount 216, all with respect to the shaft 211, and the upper and lower body portions 112, 120 (which remain stationary).

As shown, a first motor is coupled to the upper support platform 219 and has a gear 254 that engages the lower gear/bearing 252 to rotate the lower blade mount 216. And a second motor is coupled to the lower support platform 219 and has a gear 254 that engages the upper bearing 252 to rotate the upper blade mount 216. Thus, the motors are mounted off center and impart force on perimeter of gears, so the motors 256 are placed at opposite sides of the shaft 211 to improve balance. This configuration is desirable since there is an increase in torque over true center axis drives and it allows spacing to interchange various drive gear sizes to achieve greater gear ratios if needed.

The shaft 211 has a longitudinal axis that is substantially orthogonal to the flat inner surfaces 122 of the bodies 112, 120 and is substantially positioned at the center of the bodies 112, 120. The ring mount 218 is the outermost feature of the drive assembly 210, then the blade mount 216, then the bearing 252, and then the motor mount 219, in sequential order, though any suitable arrangement can be provided. The ring mount 218, blade mount 216 (including the center portion 217 and arms 214), bearing 252, support platform 219, gear 254, are flat members that form respective planes. The planes of the respective ring mount 218, blade mount 216, bearing 252, support platform 219, gear 254 are substantially parallel to each other and to the planar cover plates 117, 123 (and specifically the top surface 122). The planes of the respective ring mount 218, blade mount, 216, bearing 252, support platform 219, gear 254 (as well as the plates 117, 123) are substantially orthogonal to the longitudinal axis of the shaft 211 to extend outward with respect to the shaft 211. In addition, the blades 130 generate a thrust in the downward direction, which is substantially parallel to the longitudinal axis of said central shaft 211.

The motors 256 are elongated and have a longitudinal axis that is substantially parallel to the longitudinal axis of the shaft 211. The motor drive assemblies are equally spaced from the center shaft 211, allowing for perfect horizontal weight balance. Since they are not at the immediate center axis, they achieve a clear torque advantage to drive the main lift blades.

As further shown in FIGS. 3-6, the blades 130 extend from the center of the main body 110 linearly outward past the outer periphery 115 of the craft main body 110. The blades each have a lift portion 136 and a coupling portion 138, with the coupling portion 138 forming the proximal end of the blades 130 and the lift portion 136 forming the distal end of the blade 130. The lift portion 136 is aerodynamically shaped and positioned to create lift during rotation of the blade 130. The coupling portion 138 is integrally formed with the lift portion 136, and can substantially have a uniform width and be planar. A coupling plate 215 is utilized to couple the arm 214 of the blade mount 216 to the coupling portion 138 of the blade 130. As best shown in FIG. 6, the coupling plate 215 is a relatively flat elongated member. One end section of the plate 215 is fixedly attached to the arm 214 and the other end section of the plate 215 is fixedly attached to the coupling portion 138 of the blade 130. Thus, as the arm 214 rotates under power of the motor 256, the entire blade 130 including the lift portion 136 also rotates.

In the embodiment shown, the coupling plate 215 is placed on top of the coupling portion 138 and the arm 214, and secured thereto by fasteners (e.g., as screws or bolts). Of course, any suitable connection can be made between the coupling portion 138 and the arm 214, and a coupling plate

215 need not be utilized. In addition, it is noted that the arm 214 is separate from the lift portion 138. That allows the blade to be easily removed and replaced as needed by disconnecting the coupling plate 215 from the blade 130. That also provides easy assembly of the drive system 200 with the shortened arms 214 rather than with the much longer blades 130. However, it will be appreciated that the arm 214 need not be separate from the lift portion 138, and can be formed as a single integral member.

Referring to FIGS. 1-5, 7, the lift portion 136 is at the outer periphery of the craft. There is no structure below the blades 130, and specifically the fuselage is not below the blades 130. Thus, the thrust generated by the blades is unobstructed and no structure interferes with the thrust created by the blades. Moreover, the entire lift portion 136 out outside of the outer periphery 115 of the upper and lower bodies 112, 120, so that the craft is aerodynamic and air can flow unobstructed above and below the blades 130 to generate lift outside the outer periphery without airflow obstruction above or below the blades 130. The body is also streamlined, creating a smooth airflow around the craft, enchaining lift and maneuverability with substantially reduced RPM and power requirements to maximize efficiency. Thus, the blades' entire surface area is utilized, maximizing lift and increasing use and efficiency. It should further be recognized that the upper body 112 need not be the same size and shape as the lower body 120, and for example the upper body 112 can be larger or smaller than the lower body 120.

Figure 7:
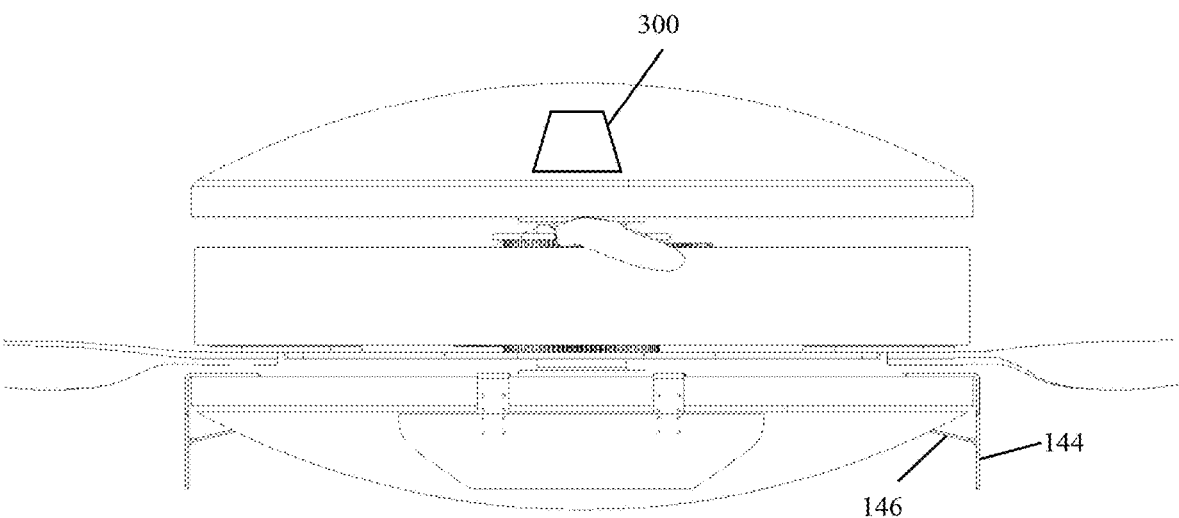
FIG. 7 is a side view of the aircraft showing the steering flaps.

As still further shown in FIGS. 1-5, 7, a flight or directional control assembly 140 is provided about the lower body 120. The direction control assembly 140 includes a bracket 142, a direction regulator such as a flap 144 (FIG. 4), and control device such as a servomechanism 146 (FIG. 7). The bracket 142 connects the flap 144 to the top surface 122 of the lower body 120. In the non-limiting illustrative example shown, the bracket 142 can have an L-shape, with an elongated mounting leg portion substantially orthogonal to a coupling leg portion. The mounting leg portion is flush with the top surface 122 and fixed to the top surface 122 by one or more fasteners or by adhesive or welding. The coupling leg portion extends downward from the top surface 122 and is coupled to the flap 144. More than one L-shaped bracket 142 can be provided for a single flap 144, as shown.

The servomechanism 146 can be controlled by a pilot (located either remotely via remote control or locally onboard) to pivot the flap 144 with respect to the lower body 120. In the non-limiting example shown, the flap 144 is an elongated member with a longitudinal axis and can be beveled at the sides to be aerodynamic. The elongated axis can extend parallel to the respective side of the aircraft. And, the flap is flat and planar, and is shown with the planar surface extending substantially parallel to the respective side of the aircraft 100. Thus, the flap 144 can have a substantially flat or planar/linear outer surface and can be thin, such as a plate. More than one control assembly 140 can be provided about the outer circumferential periphery 115 of lower body 120, and four equally-spaced control assemblies 140 are shown in the example embodiment of the figures.

The flaps rotate between a first position and a second position. In the first position, the outer planar surface of the flap is substantially parallel to the direction of the thrust from the blades to avoid interference with the thrust. In the second position, the flaps are pivoted outward with respect to the outer periphery to partially engage the thrust, e.g., to partially obstruct or deflect the thrust.

Thus, the aircraft 100 pitch and roll is controlled with set of four flaps 144 adjusted by servos 146 controlled by the flight controller. In an alternative embodiment to flaps for pitch and roll control, the craft 100 attitude can be affected by a dynamic 2-axis mass system. The mass system would include a weight mounted on an arm that rotates around the center of the craft, and the mass can move in and out radially along the arm at the same time. This would change the center of mass of the craft and allow control of the craft without flaps.

The pilot controls the flap 144 to pivot inwardly and outwardly with respect to the lower body 120. The directional control assemblies 140 control the direction of flight of the aircraft 100. The flaps 144 deflect the air and/or create a wind pattern that moves the craft 100 in a desired direction. More specifically, when the flap 122 is outward with respect to the outer periphery 115, it encounters the thrust from the blades 130 and the craft pitches downward at that side. The craft then moves in the direction at which that outward flap is located. In one non-limiting example embodiment, the craft can pitch by up to about 20-30 degrees for manned, or over 45 degrees for a drone. When the flap 144 is returned to the vertical (planar with the side of the craft), it no longer encounters the thrust from the blades 130. The craft then returns to the normal upright (i.e., level) position in which the horizontal axis 116 is substantially horizontal to the ground, since the weight and balance of the craft biases it back to that vertical position. With the flaps 144 in the vertical position, the craft can hover or move up/down.

Thus, the flaps 144 can be controlled by the pilot in concert to move the craft 100 in any suitable horizontal direction, including forward, back, left, right, while the blades 130 control vertical movement of the craft 100. Control wires can be connected to the servomechanism 146 and extend into the lower body 120 and alternatively to the upper body 112 via the central shaft 211.

The flaps 144 are spaced at 90 degrees about the lower saucer dome 120. When any flap is active to a position away from the dome 120, the downward thrust from the main blades 130 pushes into that flap 144, causing the craft to tilt/bank, thus enabling the thrust from the main blades to propel the craft in a horizontal forward motion. To achieve a turn of the craft, the two side flaps are alternatively activated in a similar fashion to tilt the craft in the desired direction. Using this flap mechanism and configuration, the craft can tilt/bank on a turn up to 90 degrees. And, the flaps 144 can move substantially 180 degrees, from being tucked under the craft body to being horizontally outward. And, while the flaps 144 are shown as being linear/straight, they can be curved to match the shape of the body 112 and/or 120.

Returning to FIGS. 1-2, the fully assembled aircraft 100 is shown. The upper and lower bodies 112, 120 are connected to the central shaft 211. And, an optional protective band/shroud 114 is provided. The band 114 is flat and thin and formed in the shape of a circle and forms an outer wall that is substantially aligned with and parallel to the side forming the outer periphery 115 of the upper and lower bodies 112, 120. The band 114 extends about the central channel 113 and at least partially encloses the central channel 113 and acts as a shroud to cover, conceal and protect the motor/drive area 113 (FIGS. 5, 8). One or more support arms (not shown) can be provided that extend inward and are fixedly attached to the center shaft 211 to hold the protective band 114 in place between the upper and lower blades 132, 134. The band 114 provides better air flow at the side of the craft, and also prevents debris and objects from reaching the drive assembly 200 inside the craft 100.

In an alternative embodiment, the band 114 can be solid and have a center opening for the drive system 200. The blades 132, 134 being sandwiched between the top and bottom bodies 112, 120 have a characteristic shape of "converging-diverging nozzle" that provides aerodynamic efficiency of the rotors.

The band 114 is spaced apart from the upper and lower bodies 112, 120 to allow for the blades 130 to extend therethrough. Thus, an upper slot is provided at the top end of the band 114, between the top edge of the band 114 and the bottom edge of the upper body 112. The upper blades 132 are received in and travel in the upper slot between the lower surface of the upper body 112 and the top edge of the band 114. And a lower slot is provided at the bottom end of the band between the bottom edge of the band 114 and the upper edge of the lower body 120. The lower blades 134 are received in and travel in the lower slot between the top surface 122 lower body 120 and the top edge of the band 114.

It should further be appreciated that the main body 110 can have other suitable sizes and/or shapes, and that the blades 130 can be driven in other suitable manners. And, the blades 132, 134 can be configured in different manners within the scope of the invention. It should be further appreciated that other suitable techniques can be provided to drive the blades 130.

The motor mounts 219 are welded to the spacer 212 and are spaced away from the bearing 252. In one embodiment of the invention, both of the motors 256 operate at the same time and speed to create a uniform lift and counter-rotation of the blades 132, 134. The motors 256 rotate at the same time to simultaneously drive the bearings 252 (as well as the respective blades 132, 134). The gears 254 and bearings 252 for each motor 256 are the same size, so that the blades 130 rotate at the same speeds. The same speed and operation of the blades 132, 134 provides stabilization of the aircraft by the counter-rotation blades 134, while at the same time providing sufficient lift by the main blades 132. It will be appreciated, however, that the motors 256 need not operate at the same speed, so that the blades 132, 134 can operate at different speeds. In addition, a spacer 212 need not be provided, but instead for example the shaft 211 can have a step down at the ends to fit the ring mount 218, blade mount 216, bearing 252, and/or support platform 219.

The two main lift blades 132 are positioned opposite each other (i.e., spaced approximately 180 degrees apart from one another). And the two counter-rotation blades 134 are positioned opposite each other (i.e., spaced approximately 180 degrees apart from one another). The counter-rotational blades 134 rotate in the opposite direction as the main blades 132, so that the counter-rotation blades 134 offset the torque of the main rotor blades 132. For example, the lift blades can operate in a counter-clockwise direction A (FIG. 1) about the outer periphery 115, and the counter-rotation blades can operate in a clockwise direction B (FIG. 1) about the outer periphery 115. Thus, the blades 130 travel in a circular manner about the entire outer periphery 115.

The counter-rotational blades 134 are the same size as the main rotor blades 132, but can be smaller than the main blades 132 since the main blades 132 are the primary source for lift, whereas the counter-rotational blades 134 are mostly utilized as anti-torque. It should be recognized that the blades 132 need not all be the same size and the blades 134 need not all be the same size, and one or more of the counter-rotational blades 134 can be the same size or larger than the main blades 132. And, any suitable number of blades 132, 134 can be provided, and the number of main blades 132 need not be the same as the number of counter-rotational blades 134. The size and shape of the blades can vary depending on the craft's size, payload and other variables.

It will be readily apparent that although two main blades 132 and two counter-rotation blades 134 are provided, any suitable number of blades 132, 134 can be provided within the spirit and scope of the invention. And, while the blades are described as separate, a single unitary upper blade 132 can be provided and a single unitary lower blade 134 can be provided. In addition, there need not be an equal number of main blades 132 as counter-rotation blades 134. And while the counter-rotation blades 134 are shown the same size as the main blades 132, any suitable size and configuration of those blades 132, 134 can be utilized.

Further, the need for standard mast tilt assemblies is not necessary for the main blades since lift is achieved by permanently affixing the main blades to an angle of attack appropriate for lift. That is, in the embodiments shown the blades 132, 134 are permanently fixed in a stationary position to the shaft 211 (via the blade mount 216) to provide a fixed pitch. Fixed pitch coaxial rotors increase efficiency as compared to traditional helicopter. Significant torque advantage is achieved by the drive system being positioned outward and away from the craft's center vertical axis with both the motors and gearing systems (transmission) being an integrated drive assembly.200. This allows the blades to have fixed pitch positions, which allows for altitude changes by increasing and decreasing the blade RPMs. This avoids the inefficiencies of cumbersome and heavy blade pitch assemblies as in traditional helicopters.

However, in another embodiment the blades 132 and/or 134 can be pivotally fixed to the arms 214, so that the blades 132 and/or 134 can pivot forward and backward with respect to the shaft 211. This can be used to create directional movement, whereby the pilot can propel the aircraft in any desired direction. In addition, which both an upper and lower body 112, 120 is shown, the upper or lower body 112, 120 can be replaced with a flat plate.

The craft 100 is balanced by providing the drive system assembly 200 and blades 130 below the upper body 112, and with the lower blades 134 and lower drive assembly being below the center line 116. That biases the craft to the level or upright position. The entire drive system assembly 200 is housed between the upper body 112 and the lower body 120 and centered about the center horizontal line 116 (FIG. 2). The main blades 132 are shown just at or above the center line 116, but can also be provided below the center line 116. The upper blades 132 can be located just above the center line 116 and the lower blades 134 can be located below the center line 116, and can also extend out beyond the outer periphery 115 of the main body 110.

It is further noted that a processing device and related control mechanisms at the pilot seat can be provided to control operation of the aircraft, including the speed of the blades 132, 134, maneuvering, speed, and stability. As will be apparent to those skilled in the art, the invention can be utilized for other suitable applications beyond helicopter designs.

In one non-limiting example embodiment for an unmanned aircraft, the main body 110 can be approximately 15 inches in diameter and about 10 inches in height for the fuselage, with the blades 130 each being approximately 24 inches in length (from about the center shaft of the main body 110 to the tip of the blade, including the arm 214) to form a wingspan of about 45-50 inches (from the tip of one blade to the tip of the opposite blade), whereby each blade

130 extends about 16.385 inches outward from the outer periphery 115 of the main body 110. The craft 100 could weigh approximately four kg (8.8 pounds) and could carry a payload of approximately 10 kg (22 pounds), and have a rating of about 100,000 airfoil (Reynold's number).

The shaft 211 is made of strong material, such as carbon fiber. The motors 256 can be high quality, high efficiency U.S. made KDE motors. The empty weight (no payload) is about 4 kg, the target payload is about 2 kg, and the maximum payload is about 10 kg. The max thrust is 14 kg, the hover RPM is 800, liftoff is 850, and the maximum RPM is 2200. The flight time (w/2 kg payload) is about 1 hour, and the maintenance interval is about 2000 hours of flight time. The invention has extremely high efficiency in hover (long flight time without re-charge). However, the craft 100 can weigh up to 40 pounds and carry a payload of about 70 pounds, and operate with about 2,200-3,800 rpm, or even as low as 800 rpm.

The invention provides a simple robust design due to minimal component count made possible by fixed pitch, counter rotating coaxial rotor design (no cyclical pitch swash plate mechanism, no tail rotor). The body shape and fairing with center-mounted rotors increases efficiency due to semi-ducted air flow effect (a nozzle or ducted fan). Large, low rpm rotors with low disk loading increase efficiency, for example 800 rpm (compared with 10-15,000 rpm for convention crafts). In one non-limiting example embodiment for an unmanned aircraft 100, the upper blades 132 can be approximately 2-3 inches from the lower blades 134, though any suitable spacing can be provided. The aircraft 100 is constructed of carbon fiber (e.g., the shaft 211) and aerospace aluminum (e.g., motor mount 219) for low weight. The present invention gives efficiency comparable to traditional helicopter, with simplicity of fixed prop quadcopter. And the streamlined design is more stable in wind as compared to conventional rotorcraft types.

Thus, the present invention provides an aircraft 100 that forms a saucer shaped craft with the drive mechanism wholly at the crafts horizontal centerline. Both the top cavity 112 and bottom cavity 120 areas of the fuselage are fully open (void of any drive or powering mechanism), enabling a variety of payload options. In addition to traditional on-board lithium batteries, a power tether cord of varying lengths can be affixed allowing for indefinite flight times. The upper and lower bodies 112, 120 can have a flat plate and a curved semi-circular top to define an interior space for carrying payload or passengers. For the unmanned version, the top of the saucer fuselage areas are easily removed with two standard screws allowing for quick and easy payload changes depending upon the crafts designated operational need. That allows for a variety of mission specific equipment payloads in both sections to include but not limited to: cell phone repeater systems, GPS, transmitters, batteries, PDU, flight controller, satellite link systems, photographic systems, various surveillance sensor systems, weapon systems, and data link repeater systems. The craft 10 is scalable to any size required in either a manned and unmanned variant. The size of the top and bottom cavities 112, 120 can be adjusted (larger or smaller) simply by making a taller or shorter canopy. The current design shows sleek low-profile canopy, but other designs can be utilized.

The craft can also utilize a tether wire to keep it powered and airborne indefinitely. The tether wire supplies power to the craft indefinitely if an operational need necessitates a long or sustained flight time alleviating the restrictions of lithium batteries. Since the craft uses low voltage dc motors, the lightweight and slight gauge tether wire would be ideal and have little weight or drag effect on the craft. Another advantage of the present invention is that if one motor 256 fails, the craft 100 can still land in a semi-controlled fashion (it will spin, but altitude can still be controlled). The top and bottom housing bodies 112, 120 are water proof or water resistant and can house sensitive electronics. Thus, for example, the top and bottom 112, 120 can be fully sealed for protection of critical instruments in harsh environments. Still further, the gears and motors can be configured to include backup motors that can drive the blades in the event one or both of the primary motors fail. For example, the motors can be on a movable platform that move each motor between an engaged position in which its gear 254 engages the bearing 252, and a disengaged position at which its gear 254 disengages the bearing 252 so that a backup motor can be moved from a disengaged position to an engaged position and a failed motor can be moved from an engaged position to a disengaged position.

In an alternative embodiment, the coupling plate 215, coupling portion 138 and arm 214 can be configured so that the rotors blades 130 can pivot about the coupling plate 215, so the blades 130 can be folded back with respect to the arms 214, by 90 degrees or more, for storage and transportation. This also reduces vibration effects due to blade flutter by allowing the blades to "lead-lag" as necessary as they rotate around. This is a factor when the craft is in forward (non-level, non-hover) flight.

The invention has a modular design. That is, the fuselage size, rotor span, number of rotors, motors, can be changed easily around core structure based on mission requirements (i.e., longer flight time vs. more thrust). The upper cavity 112 is completely empty and unobstructed for highly adaptable payload capabilities (GPS, transmitter, camera, solar panels, parachute, etc.). The bottom cavity 120 can contain a majority of components for increased stability (batteries, flight controller, ESC, transceiver, etc.). The top and bottom 112, 120 are isolated for improved communications, isolated transmission signals. The top and bottom 112, 120 are symmetrical so that components can be used at each to reduce unit cost. The stability also makes the aircraft 100 suitable for water landings.

Because of the increased efficiencies of the present invention, shortened and/or wider blades 130 can be provided and achieve a greater lift coefficient per unit of surface area than traditional blades. With the main lift blades 132 at the horizontal center line of craft, a parachute (or multiple parachutes) can be located at the top of the craft's airframe superstructure. A compartment can be provided at the top of the upper body 112, and the compartment can be opened to release the parachute. The compartment can be opened by the pilot or can open automatically when the craft control system detects that the craft is rapidly losing altitude or is otherwise out of control, such as in the event of a catastrophic power or mechanical failure. The parachute provides a non-fatal landing. Additionally, based upon the aircraft's design and low center of gravity, in the event of an emergency water landing, the craft will not flip over and more importantly, will float upright for a sustained period of time allowing passengers/pilot escape from a hatch located at the top of the craft.

Since the craft's lift and counter-rotation blades are at the periphery of the horizontal center line of craft, weapon systems can be imbedded on both the bottom and top of the craft allowing a nearly full spherical 360 degree deployment. With the lift and counter-rotation blades being very short and close to the craft's main superstructure, the availability of suitable landing zones is greatly increased. In addition, since the proposed mechanical and blade lift mechanism achieves greater lift per unit of horsepower, a greater level of armoring on lower airframe can be used to protect craft from ground fire. Finally, the craft can easily be configured in a drone capacity and remotely piloted.

The craft 100 is shown more particularly configured in an unmanned (i.e., drone) capacity. Here the craft 100 is configured as a drone and can be operated, for instance, by remote control. In addition, the drone/UAV is much smaller than the manned variant so accordingly, all the components such as the crafts fuselage (if needed), drive motors, lift blades etc. . . . will be smaller. Likewise, if the drone/UAV is of significant size so as to not warrant battery use, the original application's power generation scheme can be used applying smaller jet engines linked to appropriately smaller electric generators.

When the lift and drive system of the invention is applied to rotor type drone/UAV craft, the stability and efficiency as a platform is greatly enhanced similar to that achieved by the helicopter variant.

Still further, the drone craft 100 includes components needed to communicate with a user remote control device. For instance, the craft 100 can have a wireless receiver to receive signals from the user remote control device. The receiver can communicate by radio frequency (RF), infrared (IR), Bluetooth, or any other suitable frequency or wireless communication. The craft 100 can also have a control mechanism, such as a processing device or controller, that receives the command signals from the user remote control device, and controls operation of the drone craft 100. For instance, the controller can control operation of the motors 256.

In addition, one or more solar panels can be positioned on the aircraft, such as shown and described in Publication No. 2018/0244378, the entirety of which is incorporated herewith. The solar panels can have the same shape as and are adhered to the contour of the upper body 112 of the craft, and can span the entire periphery upper and/or lower bodies 112, 120 of the craft. Though the solar panels can be utilized in a manned aircraft, it is especially beneficial for unmanned aircraft (e.g., a drone). In an unmanned aircraft, the solar panels are connected to the electrical system of the craft and for instance can be used to charge lithium batteries, within the craft's body. In an unmanned craft, the batteries can be utilized to power the craft. Thus, the solar panels enable greater flight times. The solar panels can be one or more panels positioned on the top outer surface of the craft body. Together, the panels can substantially form a circular shape with a center opening. The circular shape can be continuous, or discontinuous to permit placement of a cockpit window or other craft feature. The present invention can be scaled to a manned aircraft with a pilot, passenger and cockpit features, such as described in U.S. Pat. Nos. 9,896,196, 9,840,323, 9,555,879, the entire contents of which are hereby incorporated by reference.

In yet another embodiment, the blades 130 can be foldable blades for a manned or unmanned craft, such as shown and described in Publ. No. 2018/0244378. Thus, the main lift blades and the counter-rotation blades can be folded upward with respect to the craft's main body. For example, the blades 130 have a first or inner blade portion and a second or outer blade portion, respectively. The inner blade portion extends outward from the body of the craft and can be substantially horizontal. A connection, such as a linear hinge or the like, rotatably couple the outer blade portion to the inner blade portion. Thus, the blades can move between an operating position in which the blades extend outwardly and the inner blade portions are linear with the outer blade portions; and a folded or storage position in which the blades are folded so that the outer blade portions are folded with respect to the inner blade portions. The outer blade portions can be folded to be substantially orthogonal to the inner blade portions and the craft body, so that the outer blade portions extend substantially vertically upward. However, the outer blade portions can be at a greater or lesser angle than 90 degrees to the inner blade portions (which extend substantially horizontally), and the outer blade portions can extend over the top of the upper body 112 of the craft body.

As shown, the connection is positioned close to the body of the craft, so that the outer blade portion is as large as possible to minimize the amount of space required by the craft when the blades are in the storage position. However, the connection can be at any suitable location along the inner and outer blades. In addition, it should be apparent that the rotating connection can be any suitable connection, and can include, for instance, hydraulic actuators or servo motors to move the outer blade portions to be positioned in each of the storage and operating positions. In the folded position, the craft takes less space and enables more efficient storage and/or transport of the craft in limited cargo spaces.

As further illustrated, the blades need not be standard elongated elements, but rather can be relatively abbreviated or shortened (i.e., short in length compared to the chord width). That is, the chord width is disproportionately increased compared to the blade length. This is possible because the periphery lift system achieves a great torque value to provide sufficient lift to support the craft. For example, the blades have a length and a width, and the length can be only slightly greater than the width.

Because of the torque advantage achieved by the craft's perimeter drive/lift system and configuration, the lift blades length can be significantly shorter in length but have a significantly wider chord than traditional helicopter blades creating an airfoil surface area equal to or greater than traditional blades but being vastly shorter so as to facilitate easier transport onboard either land or airborne platforms. Thus, for example, the length of the lift blades can be fifty percent (50%) shorter in length and one hundred and fifty percent (150%) wider in chord than traditional helicopter blades, creating an optimal airfoil surface area equal to or greater than traditional blades. The increased drag value created by such blades will be mitigated by the torque advantage. Using shortened blades will result in a total blade rotation diameter approximately fifty percent (50%) less than traditional helicopters/rotor drones.

Standard helicopter blade length is typically substantially equal to the length of the aircraft. For instance, if a helicopter platform is 40 feet in length, the resultant main lift blade is approximately 40 feet total length creating a 40 foot diameter rotation pattern. In one embodiment of the present invention, the main lift blades (and secondary blades) can be substantially shorter in length than the diameter of the craft, and for example the blades can have a length that is less than half of the diameter of the aircraft, and potentially as low as 25% of the diameter of the aircraft depending on the chord width of the blade. For example, if the circular fuselage is ten feet in diameter, each of the mail lift blades can be approximately five feet in length with a chord width approximately 2.5 feet creating an airfoil area of 12 square feet. Each of the blades extend from the craft's periphery and the total combined length of opposing blades can be approximately equal to the craft's diameter, whereby the total blade length can substantially equal the craft's length.

The increased drag value created by the "wide chord" blades is mitigated by the torque advantage gain by the periphery drive. Depending on the size and the weight of the craft, a varying number of blades can be utilized to achieve the desired lift. In addition, the blade chord width can be based on the size and weight of the craft and the number of blades and blade length. The size (chord width and length) and number of counter-rotation blades can be provided based on the size and number of main lift blades. In addition, not all the blades need be foldable. For instance, only the main blades can fold, and the counter-rotation blades can be non-folding.

As discussed, both the manned and unmanned crafts have a periphery lift system that provides greater torque to the blades. The gears are inside the body and the mechanisms used to drive those gears, such as the motors 256, gears 254, and bearings 252, can also be provided at the inside of the body. The periphery lift system provides greater torque to enable lift in the craft.

It is further noted that the description and claims use several geometric or relational terms, such as circular, rounded, tapered, stepped, parallel, perpendicular, orthogonal, concentric, and flat. In addition, the description and claims use several directional or positioning terms and the like, such as upper, lower, top, bottom, left, right, up, down, inner, outer, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the various sizes, shapes and dimensions are approximate and exemplary to illustrate the scope of the invention and are not limiting. The sizes and the terms "substantially" and "about" mean plus or minus 15-20%, more preferably plus or minus 10%, even more preferably plus or minus 5%, most preferably plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An aircraft comprising:
   a main body having an outer side;
   a thrust generator coupled to said main body and extending outward from said main body beyond the outer side of said main body to generate a thrust beyond the outer side of said main body; and a direction regulator movably coupled to said main body to move between a first position at which said direction regulator avoids interference with the thrust, and a second position at which said direction regulator at least partially engages the thrust.

2. The aircraft of claim 1, wherein the thrust pushes on said direction regulator in the second position to tilt the aircraft toward said direction regulator in the second position.

3. The aircraft of claim 2, wherein said aircraft moves in the direction in which it is pushed by the thrust.

4. The aircraft of claim 1, wherein said direction regulator has an outer planar surface that in the second position is substantially orthogonal to the thrust direction.

5. The aircraft of claim 1, further comprising a drive assembly comprising:

a central shaft;

a mount rotatably coupled to said central shaft and coupled to said thrust generator;

a bearing fixedly coupled to said mount;

a platform fixedly coupled to said shaft;

a gear rotatably engaged with said bearing;

a motor or engine mounted to said platform and rotatably driving said gear to rotate said bearing, which rotates said mount and said thrust generator.

6. The aircraft of claim 5, wherein each of said mount, bearing, platform and gear have a planar surface that are parallel to one another and orthogonal to a longitudinal axis of said central shaft, and the thrust direction.

7. The aircraft of claim 1, further comprising a movement mechanism coupled to said direction regulator configured to move said direction regulator between the first position and the second position.

8. The aircraft of claim 1, wherein said thrust generator comprises one or more rotating blades.

9. The aircraft of claim 1, wherein said direction regulator comprises a flat flap.

10. The aircraft of claim 1, wherein said direction regulator is coupled at the outer side of said main body.

11. An aircraft comprising:

a main body having an outer side;

a thrust generator coupled to said main body and extending outward from said main body beyond the outer side of said main body to generate a thrust beyond the outer side of said main body; and a plurality of direction regulators each separately and movably coupled to said main body;

a movement mechanism coupled to said plurality of direction regulators and configured to separately and independently move each of said plurality of direction regulators between a first position at which each of said plurality of direction regulators avoids interference with the thrust, and a second position at which each of said plurality of direction regulators at least partially engages the thrust.

12. The aircraft of claim 11, wherein the thrust pushes on each of said plurality of direction regulators in the second position to tilt the aircraft.

13. The aircraft of claim 12, wherein said aircraft moves in a desired direction in which it tilts.

14. The aircraft of claim 11, wherein said thrust generator comprises one or more rotating blades.

15. The aircraft of claim 11, wherein said plurality of direction regulator each comprises a flat flap.

16. The aircraft of claim 11, wherein said plurality of direction regulators are coupled at the outer side of said main body.

* * * * *